United States Patent [19]

Cunningham et al.

[11] 3,860,426

[45] Jan. 14, 1975

[54] SUBBED LITHOGRAPHIC PRINTING PLATE

[75] Inventors: Michael P. Cunningham; David J. McClune, both of Rochester, N.Y.

[73] Assignee: Eastman Kodak Company, Rochester, N.Y.

[22] Filed: Dec. 22, 1972

[21] Appl. No.: 317,583

[52] U.S. Cl. ...................... 96/86 P, 96/86 R, 96/33, 101/453, 101/456, 101/459

[51] Int. Cl. ............................................... G03c 1/94

[58] Field of Search .................... 96/86 R, 86 P, 33; 101/456, 459, 462, 453

[56] References Cited

UNITED STATES PATENTS

| | | | |
|---|---|---|---|
| 3,073,723 | 1/1963 | Deal | 96/33 |
| 3,110,596 | 11/1963 | Heiss et al. | 96/33 |
| 3,265,504 | 8/1966 | Leonard et al. | 96/33 |
| 3,301,674 | 1/1967 | Uhlig | 96/33 |
| 3,511,661 | 5/1970 | Rauner et al. | 96/33 UX |
| 3,552,315 | 1/1971 | Ormsbee | 101/459 |
| 3,554,751 | 1/1971 | Thomas | 96/33 |

*Primary Examiner*—Norman G. Torchin
*Assistant Examiner*—Edward C. Kimlin
*Attorney, Agent, or Firm*—H. E. Byers

[57] ABSTRACT

A printing plate is prepared by coating on an anodized aluminum support a hydrophilic cellulosic layer containing a water-soluble salt of a metal such as zinc, calcium, magnesium, barium, strontium, cobalt or manganese. A radiation-sensitive material to provide a polymeric printing layer is coated over the hydrophilic subbing layer, exposed to an image, and processed. In the areas where the polymeric material is removed in processing, the hydrophilic cellulosic subbing is exposed. Incorporation of the metal salt therein improves the resistance to scumming when the lithographic plate is used on a lithographic printing press.

11 Claims, No Drawings

SUBBED LITHOGRAPHIC PRINTING PLATE

BACKGROUND OF THE INVENTION

This invention is concerned with the preparation of printing plates and their use. In one aspect, the invention relates to the formation of a hydrophilic surface using a hydrophilic cellulose subbing layer containing a water-soluble salt of a metal such as zinc, calcium, magnesium, barium, strontium, cobalt or manganese over which is coated a radiation-sensitive material which provides a polymeric printing layer.

An important property of any lithographic surface is the resistance which it exhibits to scumming (inking) in the background or non-image areas. Scum manifests itself during the printing operation as printed density in the non-image areas. Problems associated with such scumming increase with age so that it is not unusual that plates, which may be free from scumming when freshly prepared, show inking of non-printing areas after some period of time after being prepared.

The advent of the use of machines for processing an exposed lithographic plate comprising an anodized aluminum surface, a cellulose subbing and a selectively removable polymeric printing layer, has increased the susceptibility to such scumming problems, since machine processing does not provide the careful individual attention to specific areas of the plate possible by hand processing. There is, thus, a need for improved subbing which will permit longer-term keeping after preparation of the plate, which can be machine processed without scumming.

U.S. Pat. No. 3,511,661, issued May 12, 1970 to Rauner et al describes an anodized aluminum lithographic surface having a hydrophilic subbing layer and various light-sensitive coatings. Water-soluble permanently hydrophilic subbing layers of polyacrylamide, etc., are illustrated.

In the preparation of subbing coatings for lithographic plates, it is known to monitor the coverage of the subbing layer by tagging with a heavy metal salt which is readily identified by X-ray fluorescence spectroscopy. Therefore, when coating polyacrylamide subbing layers on anodized aluminum prior to application of a radiation-sensitive polymer, zinc acetate is used in about 1:1 on a weight basis with the hydrophilic polyacrylamide subbing. However, lithographic plates containing a polyacrylamide sub with zinc acetate therein after a period of incubation or storage, and processed using machine processing have not been found to be free from objectionable scumming. Therefore, it has been desirable to provide a subbing for anodized aluminum plates which would eliminate scumming after incubation of the plates, especially when machine processing is employed. Accordingly, one object is to provide lithographic plates from which radiation-sensitive polymer may be removed from non-image areas more completely to eliminate scumming. Another object is to extend the keeping life of anodized aluminum, lithographic printing plates having a cellulosic subbing and a radiation-sensitive polymer thereon and to provide lithographic plates which may be cleanly processed by machine.

SUMMARY OF THE INVENTION

We have found that a subbing layer which is particularly useful comprises a hydrophilic cellulosic subbing layer containing a water-soluble salt of a metal selected from the class consisting of zinc, calcium, magnesium, barium, strontium, cobalt and manganese incorporated in the cellulosic subbing layer in an amount sufficient to reduce scumming of the plate in the areas in which the printing layer is removed.

PREFERRED EMBODIMENTS

In one embodiment, a cellulosic layer comprising carboxymethylcellulose contains a zinc salt such as zinc acetate. This coating composition is coated on an anodized aluminum surface, anodized as described in U.S. Pat. No. 3,511,661. The subbing layer is overcoated with a radiation-sensitive polymeric material prepared by condensing diethyl-p-phenylene diacrylate with 1,4-di-β-hydroxyethoxy-cyclohexane. The polymeric material is sensitized using 1-methyl-2-benzoylmethylene-β-naphthothiazoline.

After exposure of the polymeric layer, the plate is contacted with a developer solution such as that described in U.S. Pat. No. 3,707,373, issued Dec. 26, 1972 to Martinson et al.

Various supports may be used under the lithographic coating of this invention. However, the coating is intended for use on an anodized aluminum surface, particularly an anodized aluminum surface prepared according to U.S. Pat. No. 3,511,661, issued May 12, 1970 to Rauner et al. It will be appreciated, however, that other anodized aluminum surfaces can be used including those prepared employing sulfuric acid, chromic acid, oxalic acid, etc.

Various radiation-sensitive polymeric materials or photopolymerizable materials can be used over the cellulose subbing of our invention. Included among the useful materials are the radiation-sensitive polycarbonate resins desribed in Borden et al. Canadian Patent 696,996, issued Nov. 3, 1964. This material is dissolved in a suitable solvent such as monochlorobenzene and coated over the hydrophilic layer. After exposure, the unexposed areas are removed by processing with a suitable material such as benzyl alcohol and the plate is placed on a lithographic printing press wherein the image areas are subject to wetting with a greasy printing ink and the hydrophilic layers are water wettable.

In general, radiation-sensitive polymers which may be used include polyesters, such as polycarboxylates, polycarbonates and polysulfonates which contain the radiation-sensitive grouping $$-CH=CH-\overset{\overset{O}{\|}}{C}-$$

as an integral part of the polymer backbone. Polymers containing this radiation-sensitive grouping are described in U.S. Pat. Nos. 3,030,208, issued Apr. 17, 1962 to Schellenberg et al.; 3,453,237, issued July 1, 1969 to Borden et al.; 3,622,320, issued November 23, 1971 to Allen; etc.

Photopolymerizable compositions can also be used. Typical compositions are disclosed in U.S. Pat. application Ser. No. 247,747, filed Apr. 26, 1972 in the names of Noonan et al. and U.S. Pat. No. 2,791,504, issued May 7, 1957 to Plambeck.

Photomechanical images can be prepared with photosensitive elements by imagewise exposure of the element to a radiation source to harden or insolubilize the material in exposed areas. Suitable radiation sources which can be employed in exposing the element include sources rich in visible radiation and sources rich in ultraviolet radiation, such as carbon arc lamps, mercury vapor lamps, fluorescent lamps, tungsten lamps, photoflood lamps, and the like.

The exposed lithographic printing plate can be developed using conventional developer and developing techniques. For example, in developing the lithographic printing plates incorporating radiation-sensitive polyesters as noted above, the developer composition is applied to the surface of the plate for a period of time sufficient to remove the polymer from non-image areas of the plate. Gentle mechanical action aids in removing the polymer composition from these areas. Thus, swabbing is a highly useful method of applying the developer composition to the plate. The developer composition is typically used at room temperature but it can be employed at elevated temperatures up to about 32°C. After the initial application of the developer composition, a second application can be applied, followed by either a single or double application of a desensitizing composition. The plate is then dried.

The hydrophilic cellulosic compound which is particularly useful in carrying out the invention is preferably water soluble, for example, a carboxyalkylcellulose salt such as a salt of carboxymethylcellulose, carboxyethylcellulose or carboxypropylcellulose. Preferably, the sodium salt is used. It can be applied in an amount of about 0.2 to 1.1 mg/dm$^2$ on the anodized aluminum surface. The sodium salt of carboxymethylcellulose, identified as cellulose gum, is a cellulose ether, produced by reacting alkali cellulose with sodium monochloroacetate. In a preferred embodiment, medium viscosity type cellulose gum sold by Hercules Incorporated and having a molecular weight of about 250,000 is used. Methyl-cellulose and hydroxypropyl methylcellulose derivatives may also be used. Chemically, these products are cellulose ethers in which methyl or hydroxypropyl groups have been substituted upon one or more of the three hydroxyl groups present in each anhydroglucose ring of cellulose. Water-soluble commercial derivatives contain approximately two substituted groups per anhydroglucose ring. Typical methyl cellulose materials which are soluble in water are sold as Methocel MC. Hydroxyalkylcellulose can also be used, including hydroxymethylcellulose, hydroxyethylcellulose or hydroxypropylcellulose, also in proportions of about 0.2 to about 1.1 mg/dm$^2$. The molecular weight of the cellulose compound varies widely from about 80,000 to about 700,000.

The metal salts which are particularly useful include water-soluble salts of zinc, calcium, magnesium, barium, strontium, cobalt or manganese, which are formed with mineral acids or organic acids. Particularly preferred are the watersoluble salts of zinc, calcium, magnesium, barium, strontium, cobalt or manganese and carboxylic acids such as salicylic acid, acetic acid, etc. The salts are formed by methods known in the art. Typical inorganic acid salts include, for example, bromates, bromides, chlorates, chlorides, dithionates, iodides, nitrates, salicylates, acetates, sulfates, etc., of the above-listed metals.

Suitable subbing compositions are prepared in an aqueous solution although it will be realized that additional solvents, wetting agents, and the like, may also be employed. A typical subbing composition contains between 0.15 and 0.75 percent by weight solids having from 0.1 to about 0.5 percent by weight cellulosic component and about 0.05 to about 0.25 percent by weight of the metal salt (solids basis).

The following examples are included for a further understanding of the invention.

EXAMPLE 1.

Polyacrylamide (PAM) Sub Overcoated With Polymer Composition A

Radiation-sensitive polymer, Polymer A, is prepared by condensing 100-mole percent diethyl-p-phenylene diacrylate with 100-mole percent 1,4-di-β-hydroxyethoxycyclohexane. An inherent viscosity range of 0.33 to 0.39 in 1:1 phenyl-monochlorobenzene is satisfactory. A polymer blend having an inherent viscosity of 0.36 is preferred.

Radiation-sensitive coating composition, Composition A, is as follows:

| | |
|---|---|
| Polymer A | 4.0 g |
| 1-methyl-2-benzoylmethylene-β-naphthothiazoline | 0.32 g |
| Benzoic acid | 0.16 g |
| Butylated hydroxy toluene (BHT) | 0.08 g |
| Monochlorobenzene | 100.0 ml |

A 25 by 38 cm sheet of anodized aluminum, as described in U.S. Pat. No. 3,511,661, is subbed with a 0.35 percent polyacrylamide solution by whirl coating at 100 rpm. After drying, the plate is sensitized with Composition A. The plate is then exposed to insolubilizing radiation and developed with the following composition:

| | |
|---|---|
| 4-Butyrolactone | 1000.0 ml |
| Glycerol | 100.0 ml |
| Methyl abietate | 10.0 ml |
| Hydrogenated wood rosin (Staybelite) resin, Hercules Incorporated) | 1.0 g |
| Wetting agent (Zonyl A, DuPont) | 10.2 ml |
| Distilled water | 20.0 ml |
| Phosphoric acid (85 percent) | 25.0 ml |
| Glacial acetic acid | 25.0 ml |

The exposed plate is developed in a continuous processor in which the image surface is first subjected to a developer spray, and is then treated successively with two developer-laden plush-covered rollers rotating in the same direction as the plate travel, but at a higher surface velocity than the linear plate velocity, to impart a rubbing action to the exposed photopolymer layer. Excess developer is then removed by squeegee rollers, and a gumming solution is applied. After removal of excess gum, the plate is dried.

The processing just described can be advantageously accomplished in the Kodak Polymatic Plate Processor, Model 48.

EXAMPLE 2

PAM Sub With Zinc Acetate Overcoated With Composition A

A plate is prepared in Example 1, except the sub solution contains:

0.35 percent polyacrylamide (2 mg./ft$^2$ coverage)

0.35 percent zinc acetate dihydrate (2mg/ft$^2$ coverage).

EXAMPLE 3

Processing Fresh and Incubated Plates

The plates in Examples 1 and 2 are processed within 48 hours and also after incubation for two weeks at 50°C and 50 percent relative humidity. The processed plates are inked with a lithographic rub-up ink and examined for scum with the following results:

| Sub | Fresh | Incubated |
|---|---|---|
| PAM | scum | scum |
| PAM + zinc acetate | no scum | scum |

EXAMPLE 4

Carboxymethyl Cellulose (CMC) Subbing Overcoated with Composition A

Lithographic plates are prepared by coating sheets of anodized aluminum as in Example 1. The subbing solution is 0.35 percent by weight carboxymethylcellulose (2 mg/ft$^2$ coverage).

EXAMPLE 5

CMC Plus Zinc Acetate Sub

A lithographic plate is prepared as in Example 4, except the subbing layer contains:

0.35 percent carboxymethylcellulose (2 mg/ft$^2$ coverage)

0.35 percent zinc acetate dihydrate (2 mg/ft$^2$ coverage).

EXAMPLE 6

Processing Tests

Plates of Examples 4 and 5 are incubated for 2 weeks at 50°C and 50 percent R.H. processing results are summarized below.

| Sub | Fresh | Incubated |
|---|---|---|
| CMC | no scum | scum |
| CMC + Zn | no scum | no scum |

If these data are compared with those of the PAM sub (Example 3), the greater usefulness of the CMC sub will be seen, since the sub composition with the zinc salt does not scum on incubation.

EXAMPLE 7

Concentration Ranges

Subbing solutions are prepared having the following components based on weight percent of coating solution.

| CMC | Zinc Acetate Dihydrate |
|---|---|
| .10 | .05 |
| .2 | .10 |
| .3 | .15 |
| .4 | .20 |
| .5 | .25 |

Lithographic plates subbed with these solutions are prepared as in Example 1. (Total coverage about 4 mg/ft$^2$).

Processing of incubated plates shows that total solids of between 0.2 and 0.6 percent are preferred.

At the 0.3 percent total solids level, the weight ratio of Zn to CMC is examined in the following detail:

| CMC | Zinc Acetate Dihydrate |
|---|---|
| .25 | .05 |
| .20 | .10 |
| .15 | .15 |
| .10 | .20 |

Incubation tests show the preferred utility of a 1:1 weight ratio of zinc acetate dihydrate to CMC.

EXAMPLE 8

Other Metallic Salts

Using a 0.3 percent solids CMC subbing solution, various divalent metal salts are added to determine their usefulness. Processing tests after incubation as in Example 6 indicate useful results with acetate salts of calcium, magnesium, barium, strontium, cobalt and manganese.

EXAMPLE 9

Azide-Sensitized Cyclized Rubber

An anodized aluminum plate coated with a subbing as in Example 5 is overcoated with light-sensitive coating of a composition as described in Example I of U.S. Pat. No. 2,852,379, issued Sept. 16, 1958. The dry coverage of the light-sensitive resin is 85 mg. per square foot.

Thereafter, the plate is contact-exposed through a line negative for 45 seconds to a carbon lamp at a distance of 5 feet, swab-developed with a 60-40 mixture, by parts, of a Stoddard solvent and cyclohexanol, treated with a Gum Arabic desensitizer, and printed on a conventional offset lithographhic press. The plate is free from scum and 500 reproductions of excellent quality are obtained.

EXAMPLE 10

Light-Sensitive Polycarbonate

Example 9 is essentially repeated with the replacement of the light-sensitive resin by a light-sensitive polycarbonate comprising the product of a condensation reaction between 0.11 mole bisphenol A, 0.142 mole divanillal cyclopentanone and 0.30 mole phosgene as described in Canadian Patent 696,997. The results obtained are similar to those obtained with the plates described in Example 9.

EXAMPLE 11

Light-Sensitive Polymer Overcoated With Silver Halide

Example 9 is essentially repeated except that the polycarbonate layer is overcoated at a wet coverage of 0.75 ml/dm$^2$ with a fine-grain photographic silver halide emulsion prepared by combining the following portions:

Silver chloride emulsion containing 200 grams of gelatin per silver mole which contains 1 mole of silver for 4.25 kilograms of emulsion — 8.5 grams.

4-phenylcatechol dispersion containing 50 grams of 4-phenylcatechol and 50 grams of gelatin per 700 grams total weight — 28.0 grams 15 percent aqueous saponin solution — 1.0 ml.

When dry, each of the silver halide emulsion layers contains per square decimeter:

| | |
|---|---|
| Silver | 14.0 mg. |

-Continued

| | |
|---|---|
| 4-phenylcatechol | 13.2 mg. |
| Gelatin | 39.8 mg. |

The coating is exposed to a high-contrast line negative and activated for 15 seconds in a 15 percent aqueous $K_2CO_3$ solution at a temperature of 22.2°C. The unexposed, and consequently unhardened areas of the emulsion, are then washed away with a spray of tap water at a temperature of 40.5°C. Having been dried, the coated side of each plate is swabbed with an image conditioner disclosed in British Patent No. 934,691 to improve ink receptivity of the unremoved colloidal image portions. The copies obtained by printing the incubated samples are excellent reproductions of the originals and the plate is free from scumming.

EXAMPLE 12

Positive-Working Lithographic Plate

A positive-working lithographic plate can be prepared by using two radiation-sensitive layers having different photographic speeds. If the top layer has greater sensitivity to light than the underlying layer, it may be separately exposed to a positive image, processed and that resultant image may be used as a negative and the exposure of the underlying laye whose sensitivity is such that it is unaffected by the exposure used to form the image in the top layer. A positive-working plate based on this construction is prepared using the light-sensitive plate prepared in Example 10. The support with the hydrophilic layer and light-sensitive layer is coated with a camera speed silver halide emulsion of the type described in Example I of U.S. Pat. No. 2,596,756. The plate is exposed in a reversing camera to a line image for a short exposure. The exposed plate is activated in a caustic solution for 1½ minutes. The plate is rinsed with a water spray at 43°C and air dried. At this stage, the plate contains a dense silver image in slight relief on top of the light-sensitive polymer layer. It is re-exposed for 1 minute, 20 inches from a 300-watt photo-flood lamp. The plate is further processed as in Example 10. The silver halide image and the unexposed image-forming polycarbonate layer are removed. Only the light-hardened areas which are ink receptive remain on top of the hydrophilic layer. Thus, a positive-working plate results. The plate is de-sensitized and several hundred good impressions are made. The plate is free from scumming.

EXAMPLE 13

Coverage Ranges

Aqueous subbing solutions of Example 7 having 0.3 percent by weight solids (0.15 CMC and 0.15 zinc acetate dihydrate) and 0.3 percent by weight isopropanol are prepared.

Plates are prepared having the following coverages:

| CMC ($mg/ft^2$) | Zinc Acetate Dihydrate ($mg/ft^2$) |
|---|---|
| 1.0 | 1.0 |
| 1.9 | 1.9 |
| 2.9 | 2.9 |
| 4.7 | 4.7 |

When used as in Example 6, good results are obtained.

EXAMPLE 14

HEC

Example 8 is repeated using hydroxyethylcellulose and water-soluble methylcellulose in place of CMC with comparable results.

EXAMPLE 15

Photopolymerizable Composition

A composition is prepared from the following components:

| | |
|---|---|
| Poly(methylmethacrylate-co-ethyl acrylate-co-methacrylic acid) (59:25:16) (inherent viscosity 0.20, measured in N,N-dimethylformamide—0.25 g/deciliter solution at 25°C) | 3.0 g |
| 2-hydroxy-3-methacryloloxypropyl-4-methacryloyloxybenzoate | 3.0 g |
| Michler's ketone | 0.3 g |
| Benzophenone | 0.3 g |
| Diacetone alcohol | 50.0 ml |

Ten ml of this composition is whirl-coated on anodized aluminum subbed with CMC plus zinc acetate as in Example 5, dried, imagewise exposed to a carbon arc, and swab developed for 1 minute at 20°C in a 2 perent solution by weight of sodium carbonate. The processed plate is inked with a lithographic rub-up ink and found to be free of background scum.

The invention has been described by particular reference to preferred embodiments thereof but it will be understood that variations and modifications can be effected within the spirit and scope of the invention.

We claim:

1. In a lithographic printing plate having an anodized aluminum support, a hydrophilic cellulosic subbing layer and a selectively removable polymeric printing layer prepared from a radiation-sensitive polymer containing the grouping:

$$-CH=CH-\overset{\overset{O}{\|}}{C}-$$

the improvement in which a water soluble salt of a metal selected from the class consisting of zinc, calcium, magnesium, barium, strontium, cobalt and manganese is incorporated in said cellulosic subbing layer in an amount sufficient to reduce scumming of said plate in areas in which said printing layer is removed.

2. A lithographic plate of claim 1 in which said cellulosic layer comprises a carboxyalkylcellulose salt.

3. A lithographic plate of claim 2 in which said cellulosic layer comprises carboxymethylcellulose salt.

4. A lithographic plate of claim 1 in which said cellulosic layer comprises hydroxyethylcellulose.

5. A lithographic plate of claim 1 in which the coverage of said subbing layer is about 0.2 mg to about 1.1 $mg/dm^2$.

6. A lithographic plate of claim 1 in which said polymeric printing layer is comprised of a radiation-sensitive glycol p-phenylene diacrylate polyester.

7. A lithographic plate of claim 1 comprising a zinc salt.

8. A lithographic plate of claim 1 having therein said salt in an amount of about 50 to about 200 percent by weight of said cellulosic subbing layer.

9. A lithographic plate of claim 1 having thereon said salt in an amount of about 1:1 on a weight basis in said cellulosic subbing.

10. A lithographic plate of claim 1 having thereon a salt selected from the class consisting of salicylate, acetate, acetylacetonate, propionate, bromide, chloride, benzoate, borate, fluoride, iodide, nitrate, sulfate and thiocyanate.

11. A lithographic plate of claim 1 in which said polymeric printing layer is prepared from a photopolymerizable material.

* * * * *